United States Patent
Ohshima et al.

(10) Patent No.: US 7,799,403 B2
(45) Date of Patent: Sep. 21, 2010

(54) OPTICAL STORAGE MEDIUM

(75) Inventors: Katsunori Ohshima, Yokohama (JP); Koji Tsujita, Yokohama (JP); Hideo Machida, Yokohama (JP); Masanori Takahashi, Yokohama (JP); Kenichi Shimomai, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 550 days.

(21) Appl. No.: 11/824,905

(22) Filed: Jul. 3, 2007

(65) Prior Publication Data

US 2008/0008851 A1   Jan. 10, 2008

(30) Foreign Application Priority Data

Jul. 5, 2006   (JP) .............................. 2006-185320

(51) Int. Cl.
*B32B 3/02*   (2006.01)
(52) U.S. Cl. ................. 428/64.1; 428/64.4; 430/270.11
(58) Field of Classification Search ........................ None
See application file for complete search history.

(56) References Cited

U.S. PATENT DOCUMENTS

| | | | | |
|---|---|---|---|---|
| 5,260,165 A | * | 11/1993 | Satou et al. ............ | 430/270.16 |
| 5,679,386 A | * | 10/1997 | Murakami et al. ........... | 425/175 |
| 2005/0123710 A1 | * | 6/2005 | Matsumoto et al. ......... | 428/64.4 |

FOREIGN PATENT DOCUMENTS

| | | |
|---|---|---|
| JP | 2001-026180 | 1/2001 |
| JP | 2001-266402 | 9/2001 |
| JP | 2002-254822 | 9/2002 |
| JP | 2003-025726 | 1/2003 |

\* cited by examiner

*Primary Examiner*—Elizabeth Mulvaney
(74) *Attorney, Agent, or Firm*—Renner, Kenner, Greive, Bobak, Taylor & Weber

(57) ABSTRACT

An optical disc has a first transparent substrate, a second substrate, and at least a first and a second recording layer formed between the substrates. The first substrate has a first surface and an opposing second surface, the first surface is a beam incidence surface for a laser beam, the second surface having a first concave section and a first convex section formed adjacent to each other thereon, the first concave section being farther than the first convex section from the incidence surface, first pre-pits being formed on the first concave section. The second substrate has a second concave section and a second convex section formed adjacent to each other thereon, the second concave section being farther than the second convex section from the incidence surface, second pre-pits being formed on the second concave section, a top surface of each second pre-pit being closer than a top surface of the second convex section to the beam surface. The second recording layer is farther than the first recording layer from the incidence surface. The second recording layer is formed with a dye mixture of cyanine dye and imonium dye having relations Wa>Wb and na>nb, in which Wa and Wb are a mass of the cyanine dye and the imonium dye, respectively, and "na" and "nb" are refractive indices of the cyanine dye and the imonium dye, respectively, to the laser beam having a specific wavelength, and having a relation na−nc>0.1 in which "nc" is a refractive index of the dye mixture.

3 Claims, 3 Drawing Sheets

| | PERCENTAGE OF IMONIUM DYE [%] | REFRACTIVE INDEX nc | DIFFERENCE IN REFRACTIVE INDEX na (2.29) −nc | JITTER | ERROR RATE |
|---|---|---|---|---|---|
| EMBODIMENT SAMPLE 1 | 30 | 2.04 | 0.25 | 8.0 | 80 |
| EMBODIMENT SAMPLE 2 | 20 | 2.14 | 0.15 | 8.0 | 120 |
| EMBODIMENT SAMPLE 3 | 10 | 2.18 | 0.11 | 7.9 | 200 |
| EMBODIMENT SAMPLE 4 | 40 | 2.03 | 0.26 | 8.0 | 150 |
| COMPARATIVE SAMPLE 1 | 0 | 2.29 | 0 | 7.9 | 600 |
| COMPARATIVE SAMPLE 2 | 60 | 2.00 | 0.29 | 12.0 | 580 |
| COMPARATIVE SAMPLE 3 | 50 | 2.01 | 0.28 | 9.5 | 300 |

FIG. 2

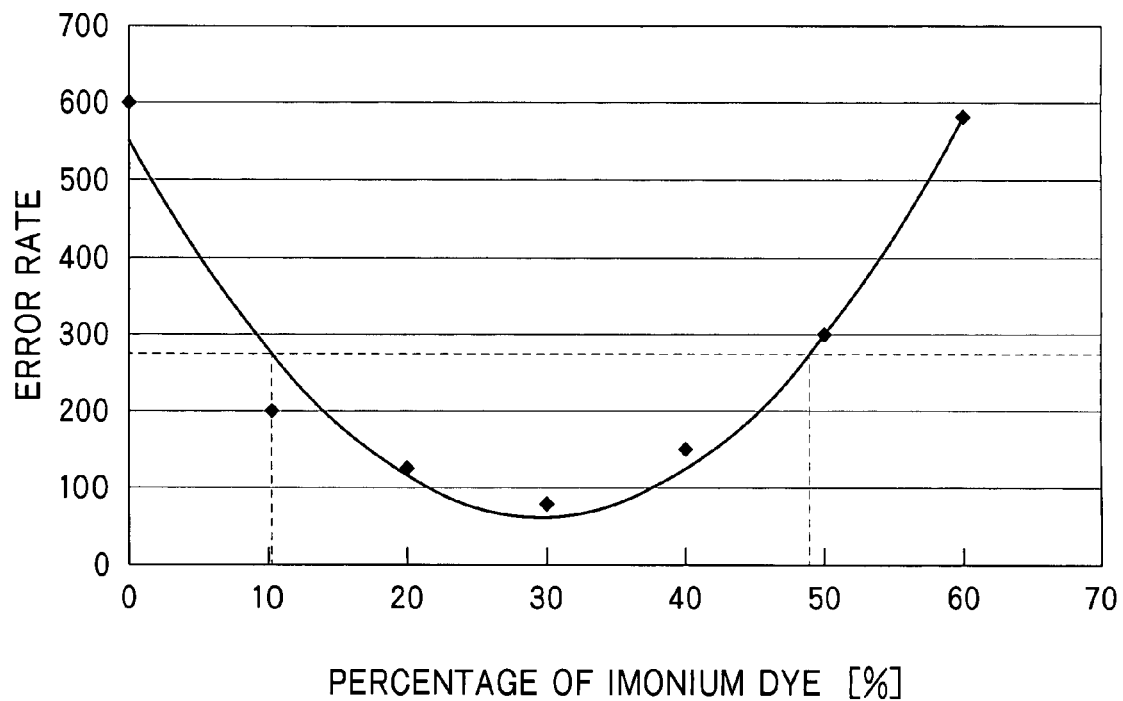
F I G. 3

OPTICAL STORAGE MEDIUM

CROSS-REFERENCE TO RELATED APPLICATIONS

This application is based on and claims the benefit of priority from the prior Japanese Patent Application No. 2006-185320 filed on Jul. 5, 2006, the entire content of which is incorporated herein by reference.

BACKGROUND OF THE INVENTION

The present invention relates to an optical storage medium having two or more of recording layers.

Optical storage media, such as DVDs, having two recording layers have been developed to meet the demands of recording/reproduction of a large amount of data.

Japanese Patent Un-examined Publication No. 2001-266402 discloses an optical storage medium having two composite layers. One composite layer has a first recording layer formed on a first substrate. The other composite layer has a second recording layer formed on a second substrate. The layers are bonded to each other so that the substrates are provided outside. In reproduction, a laser beam is incident through the first substrate and focused onto the first or the second recording layer to reproduce data therefrom. This type of optical storage media having two recording layers, illuminated with a laser beam on one side in reproduction, is called a single-sided dual-layer optical storage medium, hereinafter.

Also heavily developed is a single-sided dual-layer optical storage medium of write-once type having two recording layers made with an organic dye, protected from overwriting once data being written.

There are several schemes to reduce jitters or lower error rates in a write-once type optical storage medium having a single recording layer made with an organic dye. For, example, Japanese Patent Un-examined Publication No. 2002-254822 discloses a specific solvent that dissolves an organic dye. Japanese Patent Un-examined Publication No. 2001-26180 discloses formation of recording layers with several type of dyes exhibiting different maximum absorption wavelengths ($\lambda$max).

The above two schemes are effective for a single-layer write-once type optical storage medium, not for a single-sided dual-layer optical storage medium of write-once type, discussed above.

SUMMARY OF THE INVENTION

A purpose of the present invention is to provide an optical storage medium having two recording layers made with an organic dye, that exhibits excellent recording and reproduction characteristics with lower error rates, the most important factor in these characteristics.

The present invention provides an optical disc comprising: a first transparent substrate having a first surface and an opposing second surface, the first surface being a beam incidence surface for a laser beam in recording or reproduction of data, the second surface having a first concave section and a first convex section formed adjacent to each other on the second surface, the first concave section being farther than the first convex section from the beam incidence surface, first pre-pits carrying auxiliary information related to the data being formed on the first concave section; a second substrate having a second concave section and a second convex section formed adjacent to each other on the second substrate, the second concave section being farther than the second convex section from the beam incidence surface, second pre-pits carrying auxiliary information related to the data being formed on the second concave section, a top surface of each second pre-pit being closer than a top surface of the second convex section to the beam incidence surface; and at least a first recording layer and a second recording layer formed between the first and second substrates, the second recording layer being farther than the first recording layer from the beam incidence surface, the second recording layer being formed with a dye mixture including cyanine dye and imonium dye having relations Wa>Wb and na>nb, in which Wa and Wb are a mass of the cyanine dye and the imonium dye, respectively, and "na" and "nb" are refractive indices of the cyanine dye and the imonium dye, respectively, to the laser beam having a specific wavelength, and having a relation relation na−nc>0.1 in which "nc" is a refractive index of the dye mixture.

BRIEF DESCRIPTION OF DRAWINGS

FIG. 2 shows a table indicating the results of evaluation in several embodiment and comparative samples of the optical storage medium according to the present invention; and FIG. 3 shows variation in PI error rate depending on the percentage of imonium dye in a dye mixture, based on the results in the table of FIG. 2.

DETAILED DESCRIPTION OF PREFERRED EMBODIMENTS

Figure 1:
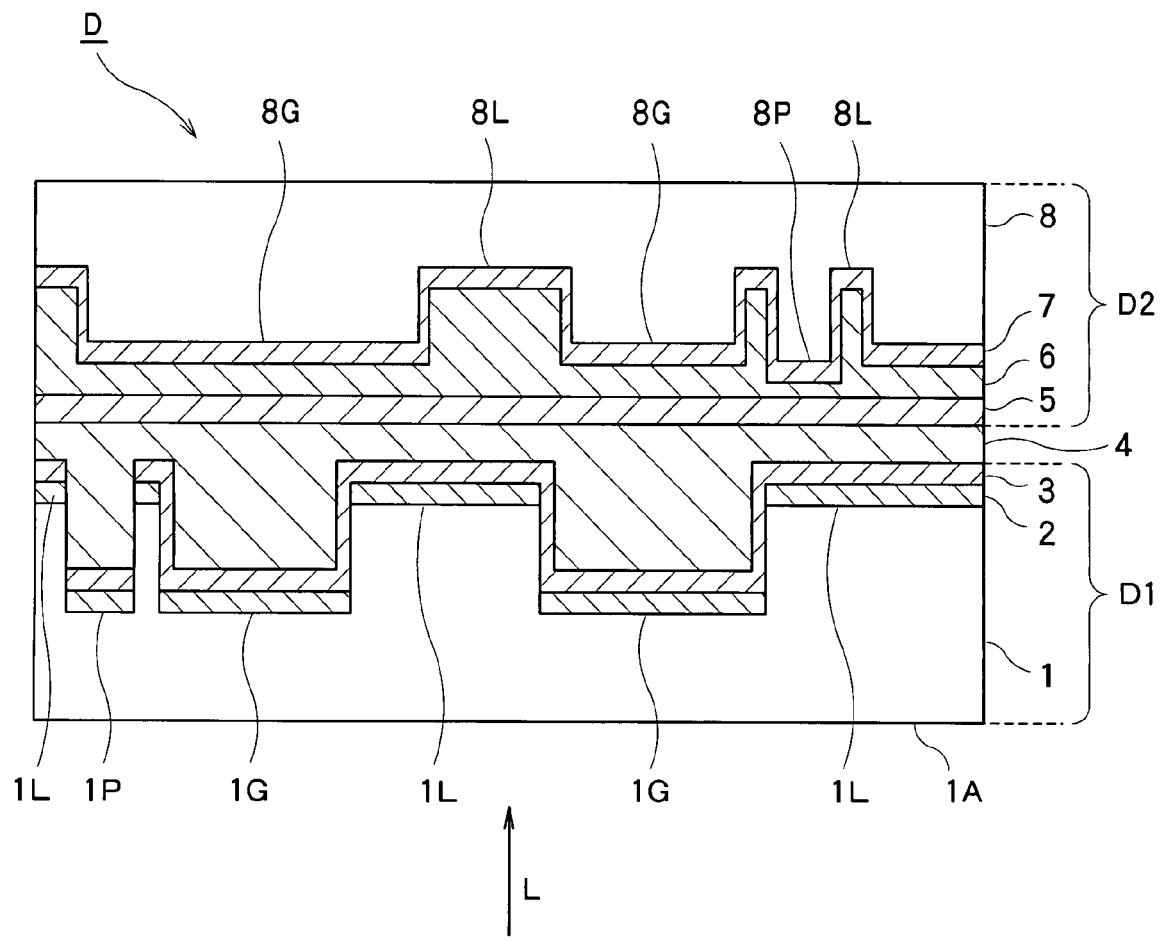
FIG. 1 shows a sectional view illustrating an optical storage medium, a preferred embodiment according to the present invention.

FIG. 1 is a sectional view illustrating an optical storage medium D, a preferred embodiment according to the present invention.

As shown in FIG. 1, formed in order on a first disc-like substrate 2 having a beam-incident surface 1A at the bottom via which a laser beam L is incident are: a first recording layer 1; a first reflective layer 3; a transparent bonding layer 4; a transparent protective layer 5; a second recording layer 6; a second reflective layer 7; and a second disc-like substrate 8.

The stacked layers from the first substrate 1 to the first reflective layer 3 constitute a first intermediate disc structure D1. The other stacked layers from the transparent protective layer 5 to the second substrate 8 constitute a second intermediate disc structure D2.

The optical storage medium D shown in FIG. 1 is a single-sided dual-layer optical storage medium having two recording layers, which is to be illuminated with a laser beam on one side in recording or reproduction.

Formed on the first substrate 1, the opposite side of the beam-incident surface 1A, are a groove 1G and a land 1L formed as adjacent to each other and alternately. Each of the groove 1G and land 1L is formed continuously and spirally from the inner to outer periphery or vice versa on the first substrate 2. The groove 1G is wobbling on both side walls. Data is recorded in the first recording layer 2 (a data storage area) formed on the groove 1G.

The groove 1G and land 1L are defined as below in the following disclosure.

In FIG. 1, the groove 1G is a section closer to the beam incident surface 1A for a laser beam L in recording or reproduction and is a convex section protruding toward the surface 1A when viewed from this surface. In contrast, the land 1L is a section farther than the groove 1G from the beam incident surface 1A and is a concave section when viewed from the surface 1A.

Formed on the land 1L are land pre-pits 1P that carry auxiliary information, such as addresses. The pre-pits 1P are formed over the entire continuous and spiral land 1L. Each pre-pit 1P is a convex section protruding towards the beam incident surface 1A when viewed from this surface.

Formed on the second substrate 8 are a groove 8G and a land 8L formed as adjacent to each other and alternately. Each of the groove 8G and land 8L is formed continuously and spirally from the inner to outer periphery or vice versa on the second substrate 8. The groove 8G is wobbling on both side walls. Data is recorded in the second recording layer 6 (a data storage area) formed on the groove 8G.

The groove 8G and land 8L are defined as below in the following disclosure.

In FIG. 1, the groove 8G is a section closer to the beam incident surface 1A and is a convex section protruding toward the surface 1A when viewed from this surface. In contrast, the land 8L is a section farther than the groove 8G from the beam incident surface 1A and is a concave section when viewed from the surface 1A.

Formed on the land 8L are land pre-pits 8P that carry auxiliary information, such as addresses. The pre-pits 8P are formed over the entire continuous and spiral land 8L. Each pre-pit 8P is a convex section protruding towards the beam incident surface 1A when viewed from this surface. Land pre-pit (LPP) signals that carry the auxiliary information are reproduced from the pre-pits 8P in reproduction from the optical storage medium D.

Thus, the land pre-pits 8P are required to be formed in size, shape and location so that the LPP signals can be efficiently reproduced. This is because the second substrate 8 is the most remote component of the medium D from the beam incident surface 1A. In addition, the size, shape and location of the pre-pits 8P are required to be adjusted so that the LPP signals can be well reproduced without being mixed with signals reproduced from the data-storage area (in the second recording layer 6 on the groove 8G) adjacent to the pre-pits 8P; otherwise, the LPP signals could be mixed with the reproduced signals as the LPP-signal level is higher, resulting in a higher error rate.

A suitable material for the first substrate 1 is a transparent material, such as, polycarbonate resin, polymethacrylic ester resin, and amorphous polyolefin resin. The second substrate 8 may not be transparent because it is not provided at the beam-incident side for the laser beam L in recording or reproduction. Nevertheless, it is preferable to use the same material as the first substrate 1 for the second substrate 8.

A suitable material for the first and second recording layers 2 and 6 is cyanine dye, phthalocyanine dye or azoic dye soluble in a polar solvent, such as alcohol or Cellosolve solvent.

The first and second reflective layers 3 and 7 are preferably made of Au, Al, Ag or an alloy of any of these metals for higher reflectivity.

A suitable material for the transparent protective layers 5 is a transparent resin, that is soluble in a nonpolar solution, for example, cyclic amorphous polyolefin (Zeonex® or Qinton® made by Zeon Co.). When the first recording layer 2 is formed with a dye material, the transparent protective layers 5 is formed by dissolving cyclic amorphous polyolefin in a solvent, such as, Cyclohexane, Tetralin or Decalin (a nonpolar solution that does not dissolve an organic dye), with spin coating.

Other choices for the transparent protective layers 5 are a semi-transparent metallic reflective layer and an inorganic transparent thin-film layer (an inorganic dielectric film). When such an alternative is used, the layer 5 may have a function of adjusting optical transmittance. In detail, adjustments to a refractive index "n" to a wavelength of a laser beam in recording or reproduction, an absorption coefficient "k", and a thickness of the protective layer 5 offer higher reflectivity to the first and second recording layers 2 and 6 and also higher optical transmittance to the second recording layer 6.

A suitable material for the transparent protective layer 5 with such a function is an inorganic transparent thin film of sulfide, oxide or nitride, such as ZnS (n=2.4), SiC (n=2.2), $TiO_2$ (n=2.5), and SiN (n=2.1).

Still, another choice for the transparent protective layer 5 is a dual-layer structure having a transparent resin thin-film layer of cyclic amorphous polyolefin mentioned above and a semi-transparent metallic reflective layer or an inorganic transparent thin-film layer.

Further choice for the transparent protective layer 5 is a UV-cured resin with metallic or ceramic microparticles mixed therein. This compound gives higher refractive index "n" to the layer 5.

A material for the transparent adhesive layer 4 is preferably an acryrate UV-cured resin for higher productivity and yielding. Main ingredients of such a resin are, preferably, for example, epoxyacryrate, urethanacryrate, and the mixture of these materials.

After applied with such a UV-cured resin by spin coating, the first and second intermediate disc structures D1 and D2 are attached to each other and then bonded to each other with irradiation of ultraviolet rays.

An alternative to the liquid UV-cured resin is an adhesive sheet for use in bonding with pressure. The adhesive sheet has a base sheet with an adhesive material thinly and slightly applied thereon and a releasable sheet stuck on the base sheet. The adhesive sheet is almost transparent to the wavelength of light in recording or reproduction. When the adhesive sheet is used, it is placed on the first reflective layer 3 of the first intermediate disc structure D1 after the releasable sheet only is peeled off, and pressed onto the layer 3 to release bubbles existing therebetween and adhered to the layer 3. The second intermediate disc structure D2 is then placed on the structure D1 so that the second transparent protective layer 5 faces the layer 3. The structure D2 is then pressed onto the structure D1 to release bubbles and adhered.

In this way, the single-sided dual-layer optical disc D shown in FIG. 1 can be produced for higher reflectivity and signal modulation factor, with no damages to the first and second recording layers 3 and 6 made of an organic dye.

Many of the dyes applicable to the first and second recording layers 3 and 6 exhibit the refractive index "n" in the range from 2.2 to 2.4 to the laser wavelength of 650 nm in recording or reproduction according to the specification of write-once type optical storage media (DVD-R), thus offering excellent recording/reproduction characteristics.

The refractive index "n" was measured with an optical-constant measuring equipment (ETA-ODT made by STEAG ETA-Optik GmbH.) with a laser beam of 650 nm in wavelength to a 60-nm-thick layer made with a material to be examined and formed on a flat polycarbonate substrate.

It is, however, revealed that the second recording layer 6 made of such a dye only suffers a higher error rate, even though jitters are acceptable. This is because the land pre-pits 8P formed on the second substrate 8 as described above causes that the LPP signals from the pre-pits 8P are mixed with (or leak into) the reproduced signals from the data-storage area (in the second recording layer 6 on the groove 8G) adjacent to the pre-pits 8P, resulting in a higher error rate.

Discussed below is a measure to restrict leakage of the LPP signals by way of variation in phase of a laser beam L to be emitted to the land pre-pits 8P, depending on the components of the second recording layer 6.

For this measure, several sample optical storage media were produced with the second recording layer 6 made with several types of dye mixture.

The dye mixture in this invention is a mixture of a main dye component and an auxiliary dye component. The main dye component is cyanine dye, phthalocyanine dye or azoic dye. The auxiliary dye component is preferably imonium dye that exhibits a lower refractive index than the main dye component. The dye mixture of the main and auxiliary dye components also exhibits a lower refractive index than the main dye component.

The following are several embodiment samples and comparative samples of the optical storage medium D in the present invention produced to examine the dye mixture for the second recording layer 6.

The difference throughout the embodiment and comparative samples is the ratio of the mass of the auxiliary dye component, imonium dye, to the main dye component for the second recording layer 6, the other layers being formed in the same way with the same material for all of the samples.

Embodiment Sample 1

Produced first was a sample-1 first intermediate disc structure D1.

A 0.6-mm-thick polycarbonate first substrate 1 with a 0.74-μm-track pitch was produced, as having a groove 1G of 160 nm in depth and 0.3 μm in width, a land 1L of 160 nm in height from the bottom of the groove 1G and 0.44 μm in width, and land pre-pits 1P, on the land 1L, with the same depth (160 nm) as the groove 1G.

Cyanine dye that exhibits 2.29 in the refractive index "n" was dissolved in tetrafluoropropanol to prepare a 1.0-wt % solution.

The solution was applied onto the first substrate 1. The substrate 1 was then rotated at 1500 rpm in spin coating. Thus, a first recording layer 2 was formed as having a thickness of 50 nm. A 10-nm-thick first reflective layer 3 was formed on the first recording layer 2 by DC sputtering in an Ar-gas atmosphere with a target of an alloy having Ag as a main component.

Accordingly, produced was the sample-1 first intermediate disc structure D1 with the first substrate 1, the first recording layer 2 and the first reflective layer 3.

Produced next was a sample-1 second intermediate disc structure D2.

A 0.6-mm-thick polycarbonate second substrate 8 with a 0.74-μm-track pitch was produced, as having a land 8L of 30 nm in depth and 0.44 μm in width, a groove 8G of 30 nm in height from the bottom of the land 8L and 0.3 μm in width, and land pre-pits 8P of 120 nm in height from the bottom of the land 8L.

The groove 8G and the land pre-pits 8P were formed as having 30 nm and 120 nm, respectively, in height from the bottom of the land 8L. Thus, the top of each pre-pit 8P was sticking out more than that of the groove 8G from the bottom of the land 8L. In other words, the top of each pre-pit 8P was closer than that of the groove 8G to the beam incident surface 1A of the first substrate 1, in a finished sample-1 optical storage medium D.

Formed on the second substrate 8 was a 70-nm-thick second reflective layer 7 made of an Ag-alloy film by sputtering. Formed on the second reflective layer 7 was a 140-nm-thick second recording layer 6 made with a dye mixture described below by spin coating at 1000 rpm.

The dye mixture in the embodiment sample 1 had cyanine dye as the main dye component and imonium dye as the auxiliary dye component at 70:30 in mass ratio (%). The cyanine and imonium dye exhibit 2.29 in the refractive index "na" and 1.89 in the refractive index "nb", respectively, to a laser beam of 650 nm in wavelength. The dye mixture was dissolved in tetrafluoropropanol to prepare a 1.5-wt % dye-mixture solution.

The second recording layer 6 made with the dye mixture exhibited 2.04 in the refractive index "nc" when measured as discussed above. The difference "na–nc" between the refractive index "na" of the cyanine dye and the refractive index "nc" of the second recording layer 6 is 0.25 (=2.29–2.04), or "nc" being smaller than "na" by 0.25.

Formed on the second recording layer 6 was a 10-nm-thick transparent protective layer 5 made with $ZnS$—$SiO_2$ ($ZnS$:$SiO_2$=20:80 in mol %) by RF sputtering.

Accordingly, produced was the sample-1 second intermediate disc structure D2 with the second substrate 8, the second reflective layer 7, the second recording layer 6 and the transparent protective layer 5.

Then, applied on the first reflective layer 3 of the sample-1 first intermediate disc structure D1 was a UV cure resin having transparency, a material of the transparent bonding layer 4, which was modified urethane acryate (World Lock®No. 811 made by Kyoritu Chemical & Co. Ltd.) in this sample.

The transparent protective layer 5 of the sample-1 second intermediate disc structure D2 was then placed on the UV cure resin applied on the sample-1 first intermediate disc structure D1 and bonded thereto by spin coating at 2000 rpm, thus the sample-1 optical storage medium D was produced with a 50-μm-thick transparent bonding layer 4.

There were no damages to the first and second recording layers 2 and 6 after bonded with the UV cure resin.

Recording and reproduction characteristics were evaluated for the sample-1 optical storage medium D with evaluation equipment equipped with a pickup having a laser of 650 nm in wavelength and an objective lens of 0.65 in numerical aperture.

The results of evaluation for the sample-1 optical storage medium D (embodiment sample 1) are shown in table in FIG. 2, with those for other embodiment and comparative samples which will be discussed later.

In the evaluation of the sample-1 optical storage medium D, a laser beam L was emitted and focused onto the first recording layer 2 of the first intermediate disc structure D1 through the beam incident surface 1A of the first substrate 1, to record a DVD-format signal to the recording layer 2 at 14 mW in laser power. A reproduced signal suffered jitters of just 7.8% (not shown in FIG. 2), demonstrating excellent recording performance.

Another laser beam L was emitted and focused onto the second recording layer 6 of the second intermediate disc structure D2 through the beam incident surface 1A of the first substrate 1, to record a DVD-format signal to the recording layer 6 at 20 mW in laser power. A reproduced signal suffered jitters of just 8.0%, as shown in FIG. 2, demonstrating excellent recording performance.

The specifications of the single-sided dual-layer optical storage medium of write-once type having two recording layers (dual-layer DVD-R) allow 8% or lower in jitters for excellent recording and reproduction characteristics.

The second recording layer 6 of the second intermediate disc structures D2 exhibited 19% in reflectivity in this evaluation, above 16% defined in the specifications of the dual-layer DVD-R.

Measured next was the PI error rate of the sample-1 optical storage medium D, which was about 80 in errors on average over the medium D, smaller than 280, the maximum in errors defined in the specifications of the dual-layer DVD-R, demonstrating excellent recording/reproduction performance.

The second recording layer 6 (of the second intermediate disc structure D2) made with the dye mixture that exhibited the lower refractive index "nc" than the refractive index "na" of the cyanine dye (the main dye component) is thought to vary the phase difference of the laser beam in recording and reproduction, thus preventing the leakage of LPP signals from the land pre-pits 8P to the reproduced signals.

Also measured was AR (Aperture Ratio), an index in evaluation of the quality of LPP signals, in the sample-1 optical storage medium D, which was 15% (not shown in FIG. 2) in the second recording layer 6 of the second intermediate disc structure D2, satisfying the specifications of the dual-layer DVD-R, demonstrating excellent reproduction of LPP signals.

Eliminated from the table in FIG. 2 for brevity were jitters in the first recording layer 2 of the first intermediate disc structures D1, and reflectivity and AR in the second recording layer 6 of the second intermediate disc structure D2.

Embodiment Sample 2

The embodiment sample 2 had 20% in mass ratio for the imonium dye to the cyanine dye, the main dye component. The dye mixture exhibited 2.14 in the refractive index "nc" with 0.15 in the difference "na−nc" between the refractive index "na" of the cyanine dye and the refractive index "nc" of the dye mixture. The second recording layer 6 exhibited jitters of 8.0%. The optical storage medium D in this sample exhibited a PI error rate of 120.

Embodiment Sample 3

The embodiment sample 3 had 10% in mass ratio for the imonium dye to the cyanine dye. The dye mixture exhibited 2.18 in the refractive index "nc" with 0.11 in the difference "na−nc". The second recording layer 6 exhibited jitters of 7.9%. The optical storage medium D in this sample exhibited a PI error rate of 200.

Embodiment Sample 4

The embodiment sample 4 had 40% in mass ratio for the imonium dye to the cyanine dye. The dye mixture in this sample exhibited 2.03 in the refractive index "nc" with 0.26 in the difference "na−nc". The second recording layer 6 exhibited jitters of 8.0%. The optical storage medium D in this sample exhibited a PI error rate of 150.

Comparative Sample 1

The comparative sample 1 had 0% in mass ratio for the imonium dye to the cyanine dye (100%). The dye mixture exhibited 2.29 in the refractive index "nc". The second recording layer 6 exhibited jitters of 7.9%. The optical storage medium D in this sample exhibited a PI error rate of 600.

Comparative Sample 2

The comparative sample 2 had 60% in mass ratio for the imonium dye to the cyanine dye. The dye mixture exhibited 2.00 in the refractive index "nc". The second recording layer 6 exhibited jitters of 12.0%. The optical storage medium D in this sample exhibited a PI error rate of 580.

Comparative Sample 3

The comparative sample 3 had 50% in mass ratio for the imonium dye to the cyanine dye. The dye mixture exhibited 2.01 in the refractive index "nc". The second recording layer 6 exhibited jitters of 9.5%. The optical storage medium D in this sample exhibited a PI error rate of 300.

The table in FIG. 2 teaches the following:

The embodiment samples 1 to 4 and the comparative sample 1 with the mass ratio of the imonium dye to the cyanine dye in the range from 0% to 40% exhibited jitters of 8.0% or lower, indicating recorded marks being formed excellently.

The comparative sample 2 with a mass ratio of 60% for the imonium dye to the cyanine dye exhibited jitters of 12.0%, indicating recorded marks being formed poorly. The cyanine dye affects the formation of recorded marks whereas the imonium dye affects the stability of the formed marks. The higher mass ratio (60%) of the imonium dye to the cyanine dye in the comparative sample 2 caused poor formation of recorded marks and a higher PI error rate.

The comparative sample 3 with a mass ratio of 50% for the imonium dye to the cyanine dye (50:50) exhibited jitters of 9.5%, indicating recorded marks being formed poorly.

The results shown in the table of FIG. 2 teaches one requirement, Wa>Wb, for excellent recorded-mark formation, in which Wa and Wb are a mass of the cyanine dye (the main dye component) and of the imonium dye (the auxiliary dye component), respectively.

The cyanine and imonium dye exhibit 2.29 in the refractive index "na" and 1.89 in the refractive index "nb", respectively, to a laser beam of 650 nm in wavelength, as already discussed.

The embodiment samples 1 to 4 have the relations Wa>Wb and na>nb.

Shown in FIG. 3 is the PI error rate that varies depending on a percentage of the imonium dye in the dye mixture (a mass ratio of the imonium dye to the cyanine imonium dye), based on the results in the table of FIG. 2.

FIG. 3 teaches the following:

The percentage in the range from 10% to 50% for the imonium dye in the dye mixture gives a PI error rate of 280 or lower (the maximum in errors defined in the specifications of the dual-layer DVD-R). An about 30% of the imonium dye gives the lowest error rate. A higher or lower percentage of the imonium dye out of the range described above causes a higher error rate.

A lower percentage of the imonium dye gives a larger refractive index "nc", according to the table in FIG. 2. An about 10% of the imonium dye in the dye mixture gives a PI error rate of lower than 280, like the embodiment sample 3, which further gives a refractive index "nc" smaller by 0.11 than the refractive index "na" of the cyanine dye.

In contrast, a higher percentage of the imonium dye gives a smaller refractive index "nc" to the dye mixture. A larger difference "na−nc" than 0.1 (na−nc>0.1) gives a lower error rate and hence a better recording characteristics.

As discussed above, there are several requirements for the second recording layer in the optical storage medium D according to the present invention in terms of recording/reproduction characteristics.

A first requirement is the relations na>nb and Wa>Wb that give excellent recording/reproduction characteristics, especially, on PI error rate, in which "na" and "nb" are the refractive indices of the cyanine dye (the main dye component) and the imonium dye (the auxiliary dye component), respectively, in the dye mixture of the second recording layer, to a laser beam having a specific wavelength, such as 650 nm, and Wa and Wb are a mass of the cyanine dye and the imonium dye, respectively.

A second requirement is the relation na−nc>0.1 for excellent recording/reproduction characteristics, in which "nc" is the refractive index of the dye mixture.

A third requirement is the percentage of the imonium dye in the dye mixture in the range from 10% to 50% for excellent recording/reproduction characteristics, especially, the range from 20% to 40% for a lower error rate, such as, about 150, as shown in FIG. 3.

As disclosed above in detail, the present invention offers excellent recording/reproduction characteristics, especially, on the PI error rate, to an optical storage medium having two recording layers made with an organic dye.

What is claimed is:

1. An optical disc comprising:
    a first transparent substrate having a first surface and an opposing second surface, the first surface being a beam incidence surface for a laser beam in recording or reproduction of data, the second surface having a first concave section and a first convex section formed adjacent to each other on the second surface, the first concave section being farther than the first convex section from the beam incidence surface, first pre-pits carrying auxiliary information related to the data being formed on the first concave section;
    a second substrate having a third surface having a second concave section and a second convex section formed adjacent to each other, the second surface of the first substrate and the third surface facing each other, the second concave section being farther than the second convex section from the beam incidence surface, second pre-pits carrying auxiliary information related to the data being formed on the second concave section, a top surface of each second pre-pit being closer than a top surface of the second convex section to the beam incidence surface; and
    at least a first recording layer and a second recording layer formed between the first and second substrates, the second recording layer being farther than the first recording layer from the beam incidence surface, the second recording layer being formed with dye mixture including cyanine dye and imonium dye having relations Wa>Wb and na>nb, in which Wa and Wb are a mass of the cyanine dye and the imonium dye, respectively, and "na" and "nb" are refractive indicies of the cyanine dye and the imonium dye, respectively, to the laser beam having a specific wavelength, and having a relation na−nc>0.1 in which "nc" is a refractive index of the dye mixture.

2. The optical disc according to claim 1 wherein a percentage of the imonium dye in the dye mixture is in the range from 10% to 50%.

3. The optical disc according to claim 1 wherein the specific wavelength is 650 nm.

* * * * *